(12) United States Patent
Nonaka

(10) Patent No.: US 6,906,277 B2
(45) Date of Patent: Jun. 14, 2005

(54) REINFORCEMENT BUTT STUD WELDING METHOD AND DEVICE THEREFOR AND REPAIRING/EXPANDING METHOD FOR FERROCONCRETE STRUCTURE

(75) Inventor: Haruo Nonaka, Sakai (JP)

(73) Assignee: Matsuo Engineering Co., Ltd., Osaka (JP)

( * ) Notice: Subject to any disclaimer, the term of this patent is extended or adjusted under 35 U.S.C. 154(b) by 121 days.

(21) Appl. No.: 10/311,343

(22) PCT Filed: Jul. 6, 2001

(86) PCT No.: PCT/JP01/05872
§ 371 (c)(1),
(2), (4) Date: Jan. 3, 2003

(87) PCT Pub. No.: WO02/04163
PCT Pub. Date: Jan. 17, 2002

(65) Prior Publication Data
US 2003/0116538 A1 Jun. 26, 2003

(30) Foreign Application Priority Data

| Jul. 6, 2000 | (JP) | 2000-205936 |
| Sep. 20, 2000 | (JP) | 2000-286033 |
| Oct. 18, 2000 | (JP) | 2000-318524 |
| May 25, 2001 | (JP) | 2001-157752 |

(51) Int. Cl.[7] ............................................... B23K 9/20
(52) U.S. Cl. ................................ 219/99; 219/98; 219/56
(58) Field of Search ............................. 219/98, 99, 56, 219/57, 58

(56) References Cited

U.S. PATENT DOCUMENTS

| 2,718,579 A | * | 9/1955 | Kennedy ..................... 219/98 |
| 5,130,510 A | * | 7/1992 | Zeigler et al. ................ 219/99 |
| 5,824,987 A | * | 10/1998 | Volk ............................. 219/98 |
| 6,163,005 A | * | 12/2000 | Easterday .................... 219/99 |

FOREIGN PATENT DOCUMENTS

| JP | 34-1259 | 3/1959 | |
| JP | 36-25536 | 9/1961 | |
| JP | 58-6780 | * 1/1983 | ............ B23K/9/20 |
| JP | 3-221613 | 9/1991 | |
| JP | 6-269945 | * 9/1994 | ............ B23K/9/20 |

* cited by examiner

Primary Examiner—Kevin P. Kerns
(74) Attorney, Agent, or Firm—Armstrong, Kratz., Quintos, Hanson & Brooks, LLP

(57) ABSTRACT

A reinforcement butt stud welding method and a device therefore, capable of butt-welding a stud reinforcing bar coaxially to the end portion of a horizontally-laid existing reinforcement in a small work space; and a repairing/expanding method for a ferroconcrete structure. The reinforcement butt stud welding method includes the steps of fitting an earth clamp over the periphery of the end portion of the existing reinforcement, fitting an annular stud base that is a heat-resisting, insulating material to the conductor surface of the earth clamp by being pressed against the conductor surface, bringing the tip end of a stud reinforcing bar, loaded in a stud welding gun, into contact with the end face of the existing reinforcement, and keeping a ferrule disposed around the tip end portion of the stud reinforcing bar joined to the stud base to complete stud welding.

9 Claims, 17 Drawing Sheets

(b)

REINFORCEMENT BUTT STUD WELDING METHOD AND DEVICE THEREFOR AND REPAIRING/EXPANDING METHOD FOR FERROCONCRETE STRUCTURE

TECHNICAL FIELD

The present invention relates to a reinforcement butt stud welding method allowing for coaxial butt welding of a stud reinforcement to an end portion of a horizontally laid existing reinforcement in a narrow work space and an apparatus therefor, and also to a repairing/expanding method for ferroconcrete structure suitable for replacing an expansion unit disposed in a joint portion of deck slabs of a bridge, lateral width expanding the deck slabs of a bridge, or reinforcing and modifying the internal surface of a tunnel.

BACKGROUND ART

In recent years, collapses have been occurring frequently in ferroconcrete viaducts and tunnels of the Shinkansen Line and have become a serious social problem. Leaving aside the issue of causes of such collapses, ferroconcrete structures that had been built in rapidly increasing numbers in 1960–1970's that was a period of high growth of Japanese economy have been aging under the effect of exhaust gases of vehicles and acid rains and also because of the increased volume of traffic. Ferroconcrete structures are expected to have a service life of no less than 50 years, but most of the structures built in the period of high growth of Japanese economy are approaching the life limit because of worsening of the environment surrounding the ferroconcrete structures. However, service life of ferroconcrete structures can be greatly extended by conducting appropriate maintenance and repair within appropriate periods.

For example, in bridges, such as steel bridges, which have ferroconcrete deck slabs, concrete deck slabs are connected to each other in the bridge pier portions via an expansion unit. As shown in FIG. 20, an expansion unit 202 is inserted between the end portions of concrete deck slabs 200, 201. Steel members 202A, 202B of the expansion unit 202 are integrated with the end portions of respective concrete deck slabs 200, 201, and both steel members 202A, 202B are set so that comb-like pawls are mutually engaged. The expansion unit 202 provided at the end portions of concrete deck slabs 200, 201 represents a zone where the largest damage occurs and the replacement of damaged units is required.

Replacing the expansion unit 202 is an operation comprising the steps of cutting the end portions of concrete parts 203 of concrete deck slabs 200, 201 together with the internal reinforcements 204 with a rotary cutter or wire sawing apparatus, then removing the cut ends of concrete deck slabs 200, 201 and steel members 202A, 202B, breaking the cut surface of the concrete parts 203 to a thickness of about 10–15 cm with a breaking machine over the entire surface, thereby exposing the end portions of reinforcements 204, then installing a new steel member 202A, extending the exposed portion of reinforcement 204 by flare welding a stud reinforcement 205 with an about 10-cm overlapping, arranging the other reinforcement, and finally placing concrete.

The most troublesome of those operations is breaking the concrete. To minimize traffic restriction, replacing the expansion unit 202 of this type is usually conducted as an intensive operation. For this reason, the breaking process is often extended far into the night and the generated noise greatly annoys people living nearby. Furthermore, in case of extreme noise, the operation itself is sometimes interrupted because of complaints from people living nearby or by use of force.

On the other hand, there are zones where chronic traffic jams occur due to the increased volume of traffic, the clear examples being the Tokyo-Nagoya Expressway, Nagoya-Kobe Expressway, and Tokyo Expressway, and widening of traffic lanes has been conducted in various regions to relieve such traffic jams. The operation of widening a traffic lane will be briefly explained based on FIG. 21, this operation having features identical to those of the above-described operation of replacing an expansion unit. When the end portion of an existing concrete deck slab 300 shown in FIG. 21(a) is extended, first, a concrete part 301 is cut (see FIG. 21(c)) together with an internal reinforcement 302 along a cutting line L1 shown in FIG. 21(b). Then, the concrete part 301 is broken with a breaking machine or water jet till a breaking line L2 (see FIG. 21(d)) at a distance of 10–15 cm from the cutting surface 303 and the distal end portion of reinforcement 302 is exposed (see FIG. 21(e)). A stud reinforcement 304 is then joined by enclose welding or mechanical joining to the end portion of existing reinforcement 302, with an overlap of about 10 cm, and finally concrete 305 is placed (see FIG. 21(f)). The reference symbol 306 in the figure indicates a reinforcement overlapping allowance. In this case, the operation of breaking the concrete part to a thickness (a distance from the cutting surface to a cutting line L2) shown in FIG. 21(d) also was the major problem in terms of extending the work time and generating noise.

Further, in the operation of repairing and modifying the inner surface of a tunnel, a new reinforcement is installed along the inner surface of the existing tunnel and the aforesaid flare welding or enclose welding or mechanical joining has been used as means for joining the reinforcements. The operation of joining the reinforcements in this case required much time and labor, making it difficult to reduce cost.

The aforesaid enclose welding represents a technology for coaxial welding of reinforcement of the same diameter. However, this welding operation takes much time and has poor operation efficiency making it unsuitable for commercial applications. Furthermore, because of a high thermal capacity of generated heat, material properties of the reinforcement are changed. In addition, a concrete breaking operation is basically required to guarantee a welding allowance of prescribed length. Further, stud welding technology has generally been employed for welding a reinforcement to the surface of a steel plate, but stud welding has been conventionally recommended for welding to iron plates with a surface area of no less 15 cm square and usage thereof in such cases was based on common sense because of a magnetic blow effect. Furthermore, lap joining has also been widely used as technology for joining reinforcements to each other. In the lap joining process, the reinforcements are laid one on top of the other over a length of no less than 30 times the thickness of the reinforcements and tied up with a binding wire. However, welding a reinforcement with a diameter of 20 mm requires a lapping allowance of about 80 cm and is unsuitable for replacement of expansion unites or lateral width expansion of deck slabs.

Thus, it was a matter of common sense that a mating surface for welding a stud reinforcement was a plate with a rather wide area. For this reason, the operations of welding the reinforcements of about the same diameter to each other and welding the reinforcements in an almost horizontal state thereof were absolutely unimaginable within a framework of the conventional stud welding technology. Moreover, the operation of extending an existing reinforcement by welding a stud reinforcement thereto, primarily the operation of replacing an expansion unit, is conducted in a very narrow space, but the conventional stud guns have a structure in which a stud is mounted coaxially, so as to obtain an extension, to a distal end of a drive shaft which is driven linearly so as to protrude forward from a gun body. As a result, a minimum space is required of a size obtained by adding the stud length to the length to the distal end of the drive shaft of the stud gun, and setting itself becomes especially difficult when a long shaped reinforcement is used.

With the foregoing in view, it is a first object of the present invention to provide a reinforcement butt stud welding method suitable for welding of reinforcements of approximately the same diameter and also suitable for good welding of reinforcements in an almost horizontal state thereof.

It is a second object of the present invention to provide a stud welding apparatus suitable for coaxial butt welding of a stud reinforcement to an end portion of a horizontally laid existing reinforcement in a narrow work space.

It is a third object of the present invention to provide a repairing/expanding method for a ferroconcrete structure by which in the method comprising the steps of partially cutting the existing ferroconcrete structure and constructing a new ferroconcrete portion by using the above-mentioned stud welding apparatus, the operation of breaking the concrete portion can be reduced to a minimum, thereby shortening the term of works and reducing noise generation, this method being especially suitable for replacing an expansion unit disposed in a joint portion of deck slabs of a bridge, lateral width expanding the deck slabs of a bridge, or reinforcing and modifying the internal surface of a tunnel.

DISCLOSURE OF THE INVENTION

In accordance with the first aspect of the present invention, in order to attain the aforesaid first object, there is provided a reinforcement butt stud welding method comprising the steps of removably mounting an earth clamp having a conductor surface perpendicular to an existing reinforcement over the periphery of the end portion of the existing reinforcement, mounting a ring-like stud base composed of a heat-resistant electrically insulating material on the conductor surface of the earth clamp in a state in which the stud base is pressed against the conductor surface, bringing a distal end of a stud reinforcement loaded in a stud welding gun in contact with the end surface of the existing reinforcement, and conducting stud welding in a state in which a ferrule disposed over the periphery of the distal end portion of the study reinforcement is joined to the stud base.

In this case, it is preferred that the stud base be used which has a mounting opening in the central part, into which the end portion of the existing reinforcement can be inserted, a contact surface pressed against the conductor surface of the earth clamp is formed on a side surface in the axial direction of the mounting opening, and a joining surface for joining the distal end surface of the ferrule having gas release grooves and a collar receiving the ferrule and molten metal in the lower part are formed on the other side surface in the axial direction of the mounting opening.

A modification example of the first aspect of the present invention is a reinforcement butt stud welding method comprising the steps of removably mounting an earth clamp having a conductor surface perpendicular to an existing reinforcement over the periphery of the end portion of the existing reinforcement, mounting a ferrule on the end portion of the existing reinforcement or on the distal end portion of a stud reinforcement loaded in a stud welding gun, this ferrule having on both ends thereof mounting openings into which the existing reinforcement and stud reinforcement can be respectively inserted and inside thereof a space for a molten metal pool and also having gas release openings on the periphery of the space, bringing the distal end of the stud reinforcement in contact with the end surface of the existing reinforcement and conducting stud welding in a state in which the ferrule is pressed against the conductor surface of the earth clamp.

In accordance with the second aspect of the present invention, in order to attain the aforesaid second object, there is provided a stud welding apparatus in which one or a plurality of guide poles are provided in a protruding condition, parallel to a drive shaft for linear driving, in front of a stud gun body, a ferrule contact part is formed on the distal ends of the guide poles, a movable body slidably provided in the middle portion of the guide poles is linked to the drive shaft, a stud holding tool is provided on the movable body, and a stud reinforcement mounted on the stud holding tool is disposed above the gun body or on the side thereof.

In this case, it is also preferred that one or a plurality of second guide poles be provided in a protruding condition, parallel to the drive shaft behind the stud gun body, a second stud holding tool be provided on a second movable body slidably provided on the second guide poles, and a stud reinforcement be disposed above the gun body or on the side thereof by the front stud holding tool and the rear second stud holding tool.

Further, in accordance with the second aspect of the present invention, there is provided a stud welding apparatus in which a stud holding tool is provided perpendicular to a distal end portion of a drive shaft for linearly driving a stud gun body, a linear guide is provided parallel to the drive shaft along the upper surface or side surface of the gun body, an auxiliary stud holding tool is slidably provided on the linear guide, a ferrule contact member is provided at the front distal end of the gun body, and a stud reinforcement mounted on the stud holding tool and auxiliary stud holding tool is disposed above the gun body or on the side thereof.

Further, in accordance with the second aspect of the present invention, there is provided a stud welding apparatus in which a linear guide is provided along the upper surface or side surface of a stud gun body, a stud holding tool is provided on the linear guide so that the tool can be slidably moved by a linear driving mechanism, a ferrule contact member is provided at the front distal end of the gun body, and a stud reinforcement mounted on the stud holding tool is disposed above the gun body or on the side thereof.

In accordance with the second aspect of the present invention, the stud reinforcement is preferably produced as a shaped reinforcement. Furthermore, it is preferred that the stud welding apparatus comprise an earth clamp removably mounted on an existing reinforcement and having a conductor surface perpendicular to the existing reinforcement, a ring-like stud base composed of a heat-resistant electrically insulating material which is mounted in a state in which it is pressed against the conductor surface of the earth clamp on the periphery of the end portion of the existing reinforcement, and a ferrule which is mounted on the periphery of the distal end portion of the stud reinforcement and can be joined to the stud base.

In accordance with the third aspect of the present invention, in order to attain the aforesaid third object, there is provided a repairing/expanding method for a ferroconcrete structure comprising the steps of: simultaneously cutting an existing reinforcement and concrete which are at least part of the ferroconcrete structure, almost coaxially stud welding a stud reinforcement of the same diameter to the end surface of the existing reinforcement exposed on the concrete cut surface to obtain an extended reinforcement, and placing concrete.

The repairing/expanding method for a ferroconcrete structure of the third aspect of the present invention preferably comprises a rough grinding step of removing the cut surface of the ferroconcrete structure after the cutting step so that it is ground through a thickness of 1–3 cm over the entire surface and exposing the end portions of existing reinforcements, or a breaking step of partially breaking only on the periphery of the existing reinforcement on the cut surface of the ferroconcrete structure after the cutting step and exposing the end portions of existing reinforcements.

Further, the repairing/expanding method for a ferroconcrete structure in accordance with the third aspect of the present invention preferably comprises an earth clamp mounting step of fixing an earth clamp having a conductor surface serving as a ferrule contact surface and a ground terminal to the end portion of the existing reinforcement exposed on the cut surface, prior to the stud welding step, so that the conductor surface is almost perpendicular to the stud reinforcement which is to be welded thereafter. In this case, it is preferred that a stud base having thermal insulating and electric insulating properties be mounted on the ferrule contact surface of the earth clamp on the periphery of the end portion of the existing reinforcement and stud welding of a stud reinforcement be conducted in a state in which the ferrule is pressed against the stud base.

Further, with the repairing/expanding method for a ferroconcrete structure in accordance with the third aspect of the present invention, the ferroconcrete structure is concrete deck slabs of a bridge and the method is applied to replacing an expansion unit disposed in the joint portion of the deck slabs. Alternatively, in accordance with the third aspect of the present invention, the ferroconcrete structure is concrete deck slabs of a bridge and the method is applied to lateral width expanding the deck slabs. Alternatively, in accordance with the third aspect of the present invention, the ferroconcrete structure is the inner surface of a tunnel and the method is applied to repairing and modifying the internal surface of the tunnel.

BEST MODE FOR CARRYING OUT THE INVENTION

Figure 1:
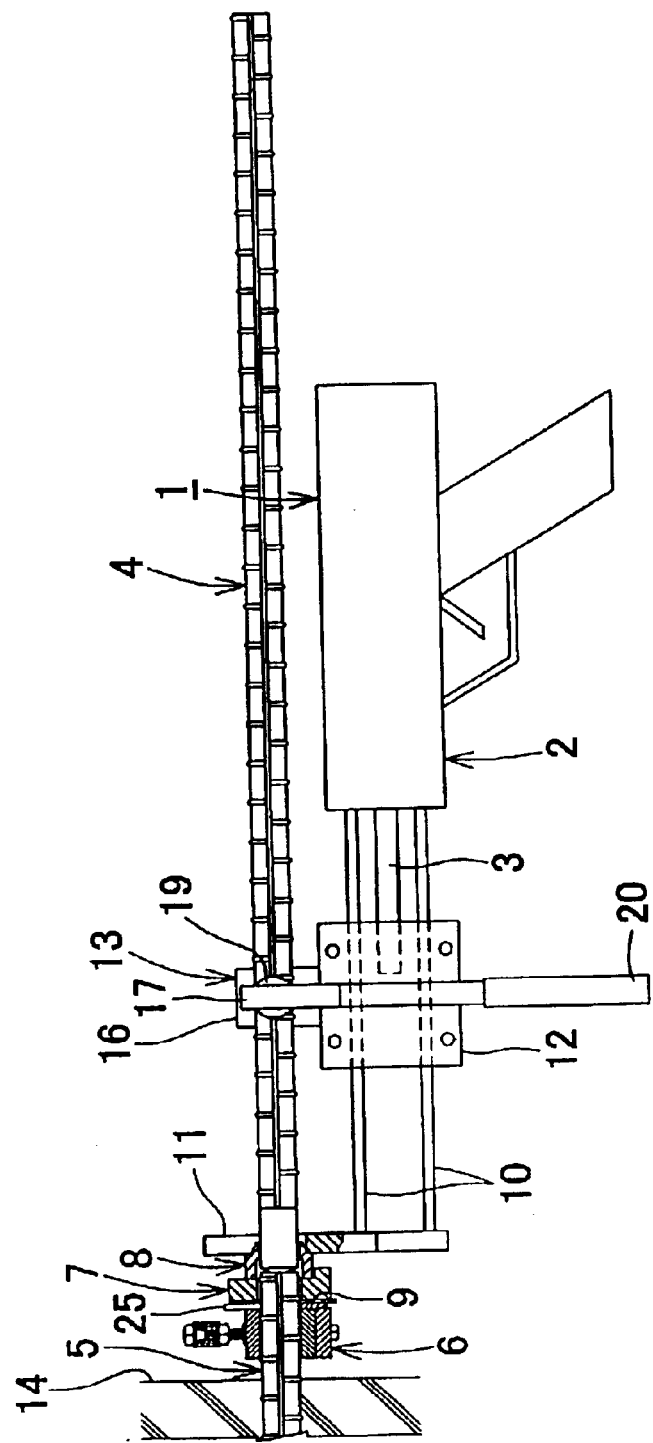
FIG. 1 is a simplified side view, with a partial cutout, illustrating the first embodiment of the stud welding apparatus in accordance with the present invention.

The embodiments of the present invention will be described below in greater details based on the appended drawings. FIGS. 1 through 5 illustrate the first embodiment of the stud welding apparatus in accordance with the present invention. In the figures, the reference symbol 1 stands for a stud gun, 2—a gun body, 3—a drive shaft, 4—a stud reinforcement, 5—an existing reinforcement, 6—an earth clamp, 7—a stud base, and 8—a ferrule.

The stud gun 1 of the first embodiment constituting the stud welding apparatus in accordance with the present invention has a basic configuration in which one or a plurality of guide poles 10, 10 are provided in a protruding condition, parallel to the drive shaft 3 for linear driving, in front of the stud gun body 2, a ferrule contact part 11 is formed on the distal ends of the guide poles 10, 10, a movable body 12 slidably provided in the middle portion of the guide poles 10, 10 is linked to the drive shaft 3, a stud holding tool 13 is provided on the movable body 12, and a stud reinforcement 4 mounted on the stud holding tool 13 is disposed above the gun body 2. If the stud holding tool 13 is set in the transverse direction, the stud reinforcement 4 can be arranged on the side of the gun body 2 (this configuration is not shown in the figures). In addition to the stud gun 1, the stud welding apparatus in accordance with the present invention comprises an earth clamp 6 removably mounted on the existing reinforcement 5 and having a conductor surface 9 perpendicular to the existing reinforcement 5, a ring-like stud base 7 composed of a heat-resistant electrically insulating material and mounted on the periphery of the end portion of the existing reinforcement 5 so as to be pressed against the conductor surface 9 of the earth clamp 6, and a ferrule 8 which is mounted on the periphery of the distal end portion of stud reinforcement 4 and can be joined to the stud base 7.

The stud welding apparatus in accordance with the present invention is especially suitable for butt welding the stud reinforcement 4 coaxially to the end portion of the existing reinforcement 5 in a narrow work space. This application is, however, not limiting, and the apparatus can be also used for stud welding of more general type. Further, it is preferred that a shaped reinforcement of the same diameter as the existing reinforcement 5 be used as the stud reinforcement 4, but it goes without saying that the round-bar reinforcement may be also used and the bars may have slightly different diameters. Furthermore, reinforcements of a variety of conventional shapes can be used as the stud reinforcement 4. In the present embodiment, the existing reinforcement 5 is assumed to be embedded in concrete 14, but the present invention can be also employed provided the existing reinforcement 5 is secured in an appropriate state.

The aforesaid components will be described below in greater detail. In the stud gun 1 used in accordance with the present invention, as shown in FIG. 1, the drive shaft 3 is provided in a protruding condition on the distal end of gun body 2, two guide poles 10, 10 are provided parallel to the drive shaft 3 so as to extend forward, and the ferrule contact part 11 for applying pressure to the below-described ferrule 8 and positioning the gun body 2 is formed on the distal ends of guide poles 10, 10. The guide poles 10, 10 may be arranged above and below or to the left and to the right of the drive shaft 3 so that the shaft is located therebetween. The movable body 12 is slidably provided in the middle portion of guide poles 10, 10. The movable body 12 is linked to the distal end of the drive shaft 3 and a stud holding tool 13 is provided on the movable body 12. The stud reinforcement 4 mounted on the stud holding tool 13 is disposed above or on the side of gun body 2, and if the drive shaft 3 is moved forward or backward by a linear drive mechanism located inside the gun body 2, the movable body 12 and stud reinforcement 4 mounted on the stud holding tool 13 move accordingly in the forward or rearward direction. The movement distance of the movable body 12 along the guide poles 10, 10 may be sufficient to provide for a stroke required for separating and feeding the stud reinforcement 4 with respect to the existing reinforcement 5 during stud welding. Therefore, in principle, the length of guide poles 10, 10 may be as short as about the sum of the stroke and the length of-movable body 12.

Figure 2:
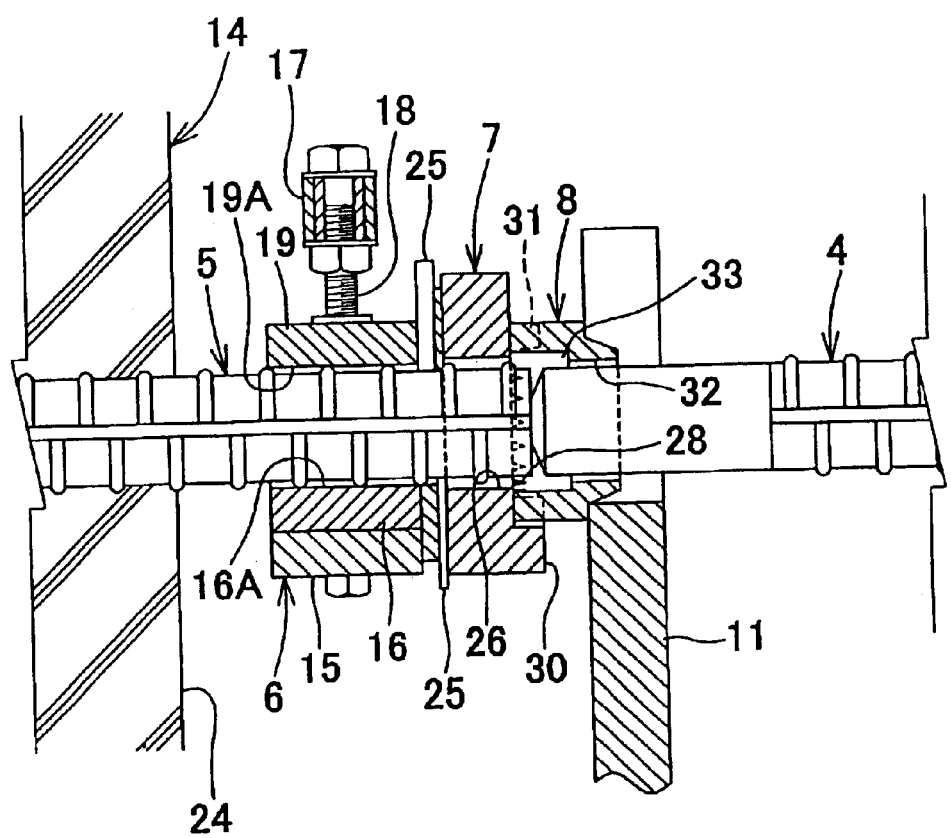
FIG. 2 is an expanded cross-sectional view of the joint portion of an existing reinforcement and stud reinforcement.
Figure 3:
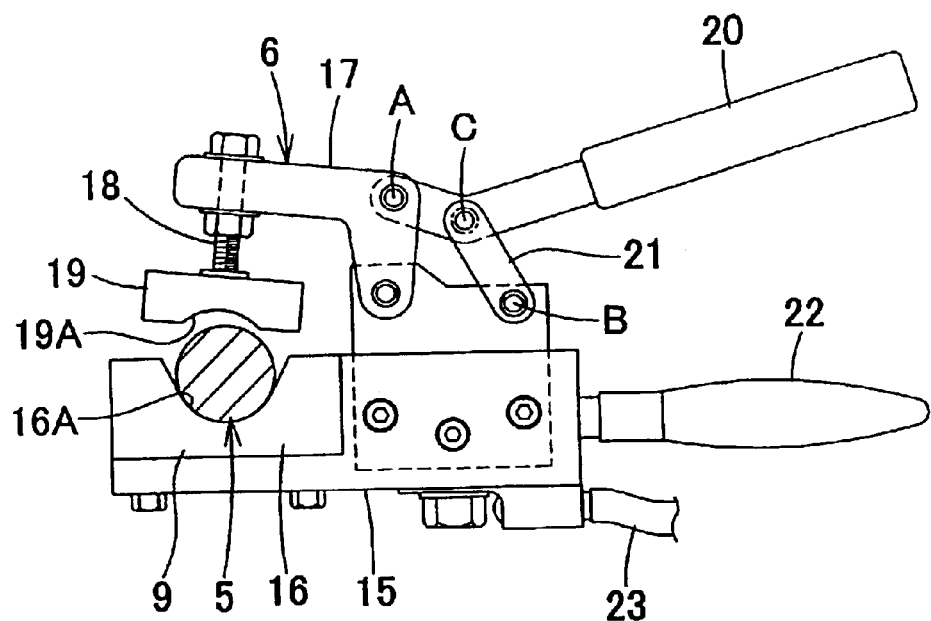
FIG. 3 is a side view of an earth clamp; (a) illustrates a state prior to sandwiching the existing reinforcement, (b) illustrates a state after sandwiching the existing reinforcement.
Figure 3:
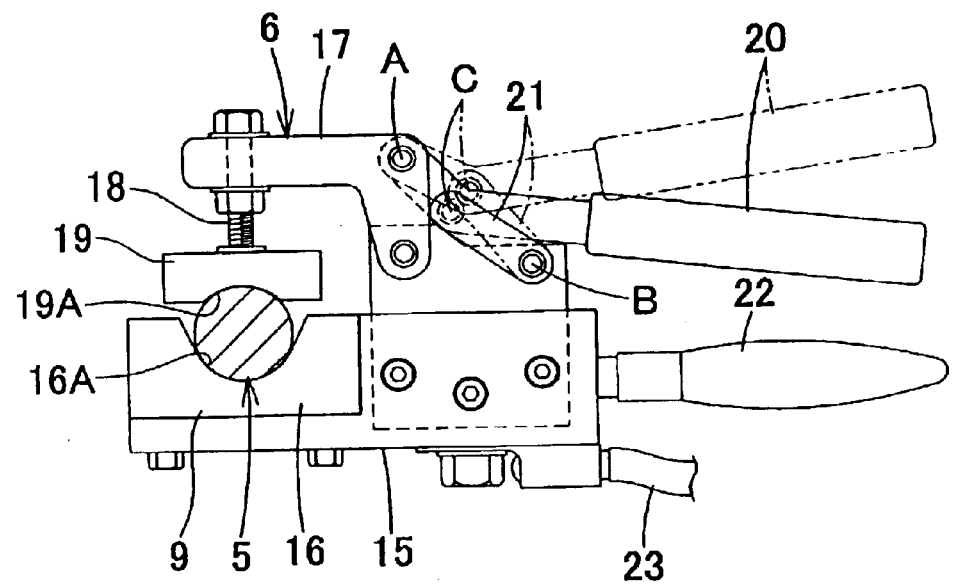

The earth clamp 6, as shown in FIG. 2 and FIG. 3, has an eccentric structure in which a bushing 16 made from a copper alloy is removably installed on the distal end portion of a base unit 15. A push member 19 is installed via an adjusting screw 18 on one end of an arm 17 with an L-like shape, when viewed from the side thereof, which is installed on the base member 15 so that the other end thereof can be rotated. The existing reinforcement 5 can be sandwiched between the bushing 16 and push member 19. A distal end of a control handle 20 which is curved to assume a V-like shape at the distal end thereof is pivotly mounted on the curved portion of arm 17, and respective ends of linking member 21 are pivotly mounted on the curved portion of the control handle 20 and the base member 15.

The mutual arrangement of pivot joint A of the arm 17 and control handle 20, pivot joint B of the linking member 21 and base member 15, and pivot joint C of linking member 21 and control handle 20 is such that when the push member 19 is opened with respect to the bushing 16, as shown in FIG. 3(a), pivot joint C is positioned above the line connecting pivot joint A and pivot joint B, and when the push member 19 is closed with respect to the bushing 16, sandwiching the existing reinforcement 5, as shown in FIG. 3(b), pivot joint C is positioned below the line connecting pivot joint A and pivot joint B. In other words, if the control handle 20 is pushed down from the state shown in FIG. 3(a), the bushing 16 and push member 19 are brought in contact with the existing reinforcement 5 and a state shown by an imaginary line in FIG. 3(b) is assumed, but if the control handle 20 is further pushed down, then pivot joint C crosses the line connecting pivot joint A and pivot joint B, taking a position below the line, and the sandwiched state of existing reinforcement 5 is maintained. A fitting recess 16A for receiving the existing reinforcement 5 is formed in the bushing 16, and a similar fitting recess 19A is formed in the push member 19. Further, a fixed handle 22 is fixed to the base member 15 in order to apply a force to the control handle 20. A ground wire 23 is connected to the base member 15. The base member 15 is curved to assume an inverted V-like shape, in a plan view thereof, and when the exposed length of the end portion of existing reinforcement 5 is small, the base portion of earth clamp 6 is prevented from contact with a breaking surface 24 of concrete 14. In the present embodiment, the above-mentioned curved angle is set at 30 degrees.

Figure 4:
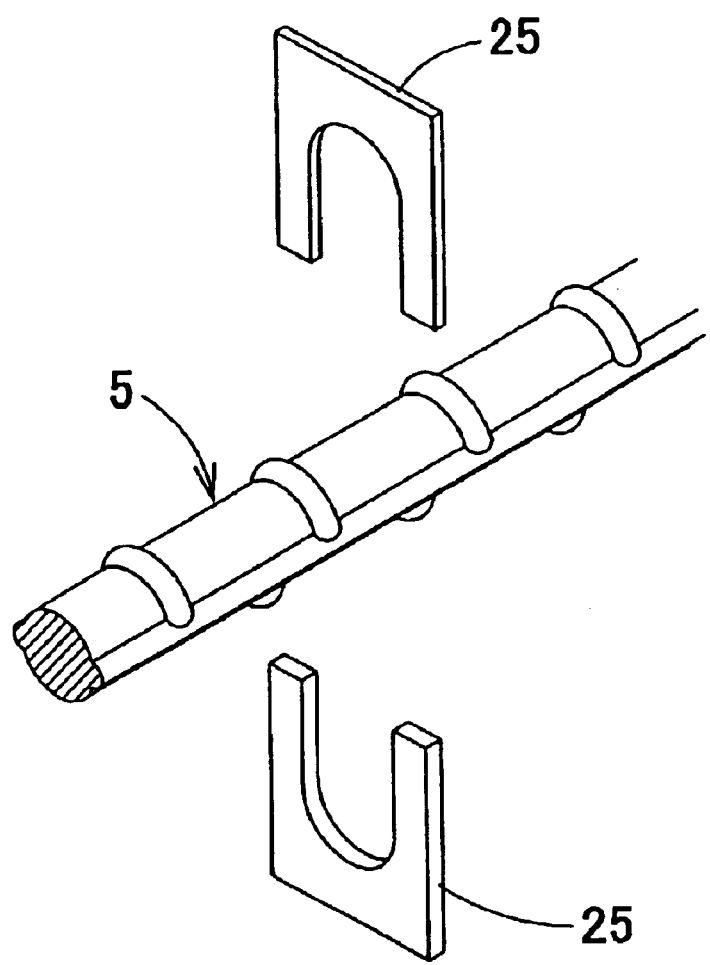
FIG. 4 is a partial perspective view illustrating mutual arrangement of a conductor plate and existing reinforcement.

A conductor surface 9 is formed by the bushing 16 and push member 19 constituting the earth clamp 6. However, in order to form the conductor surface more reliably and to prevent gas permeation during welding from the gap between the existing reinforcement 5 and the below-described stud base 7, which causes welding defects, two yoke-like conductor plates 25, 25 shown in FIG. 4 are mounted between the conductor surface 9 and stud base 7 so as to straddle the existing reinforcement 5 from mutually opposing sides. When only ferrule 8 is used and the stud base 7 is not used, the conductor plates are mounted between the conductor surface 9 and ferrule 8. The conductor plates 25, 25 have a surface and shape required to cause relaxation of a magnetic blow effect during stud welding. For example, in the present embodiment, a thin plate-like conductor plate 25 is used which is made from a copper alloy and has a side of 4–5 cm. The conductor plates 25, 25 may be engaged slidingly with each other or they may be mounted on the conductor surface of bushing 16 and push member 19, respectively.

The structure of stud holding tool 13 of gun body 2 is basically identical to that of the earth clamp 6. Here, in case of stud holding tool 13, the mobile body 12 can also serve as the base member 15 which is used in the earth clamp 6.

Figure 5:
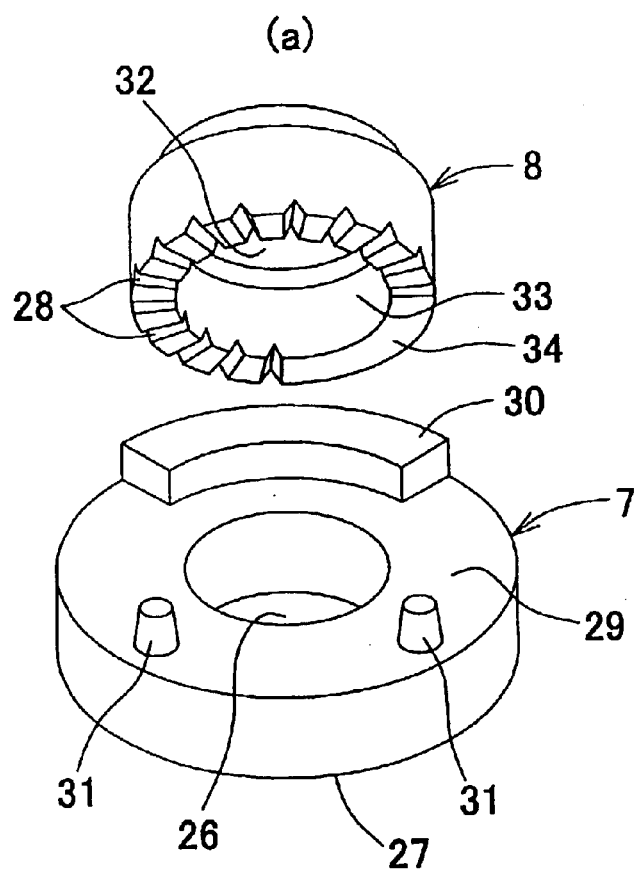
FIG. 5 is a perspective view of a stud base and a ferrule; (a) illustrates a state in which the stud base and ferrule are separated, (b) illustrates a state in which the stud base and ferrule are joined.
Figure 5:
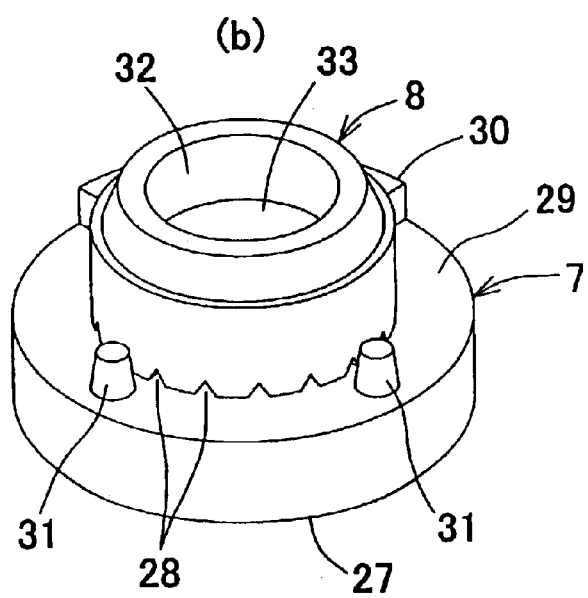

The stud base 7, as shown in FIG. 2 and FIG. 5 is formed from a heat-resistant electrically insulating material, for example, from a ceramic material of the same type as that of the below-described ferrule 8, and subjected to firing. The outer diameter of the stud base is larger than the outer diameter of ferrule 8. The stud base, in the center thereof, has an insertion opening 26 for fitting on the end portion of existing reinforcement 5, and a contact surface 27 which is to be pressed against the conductor plate 25 or conductor surface 9 of the earth clamp 6 is formed on one side surface of the stud base in the axial direction of the insertion opening 26. On the other side surface in the axial direction of the insertion opening 26, there are formed a joining surface 29 which is to be joined to the distal end surface of ferrule 8 having a gas release groove 28 and a collar 30 in the shape of a circular arc for receiving the ferrule 8 and a molten metal, the collar being located in the lower part. The central angle of the collar 30 is set to 60–180°. Furthermore, two protrusions 31, 31 located on the upper side are formed on the joining surface 29 of the stud base 7. The periphery of ferrule 8 is three-point supported by the protrusions 31, 31 and the collar 30, thereby facilitating centering thereof. Furthermore, the thickness of the stud base 7 in the axial direction is set to 3–5 mm; a specific value depends on the material strength. The thickness of stud base 7 may be larger than that, but when the existing reinforcement 5 is embedded in concrete 14 and the concrete is broken to expose the distal end of existing reinforcement 5, a smaller thickness of the stud base is preferred because it allows the breaking quantity of concrete 14 to be minimized. Further, if the thickness is too small, problems are associated with strength. Therefore, an appropriate thickness is selected.

A conventional ferrule typically used for horizontal stud welding, such as shown in FIG. 5, can be used as the ferrule 8. Such a ferrule is formed from a ceramic material and subjected to firing. Thus, in the ferrule 8, an insertion opening 32 for fitting on the distal end portion of stud reinforcement 4 is formed on a ring-like end thereof, the other end portion is expanded forming a space 33 for a molten metal pool inside thereof, and gas release grooves 28, . . . serving as escape openings for gas generated during welding are formed on the distal end surface. The distal end surface of the ferrule 8 is joined to the joining surface 29 of the stud base 7 and gas escape openings are formed at the joining surface 29 and gas release grooves 28, . . . . However, a portion corresponding to the collar 30 is a flat portion 34 and no gas release grooves 28 are formed thereon. The flat surface 34 and the joining surface 29 are brought in intimate contact. Moreover, the collar 30 is positioned therebelow. Therefore, the molten metal that has flowed out into the space 33 does not overflow this portion and does not fall down.

The procedure of coaxially welding a stud reinforcement 4 (shaped reinforcement) to the end portion of the existing reinforcement 5 embedded in the concrete 14 by using the stud welding apparatus in accordance with the present invention will be briefly described below. First, as shown in FIG. 1 and FIG. 2, the existing reinforcement 5 is cut together with the concrete 14 and the end surface thereof is exposed. Then, the concrete is broken on the periphery of the existing reinforcement or over the entire cut surface and the end portion of existing reinforcement 5 is exposed over the prescribed length so that the earth clamp 6 can be mounted on the end portion of the existing reinforcement 5. Then, the end portion of existing reinforcement 5, with the exception of distal end thereof, is held in a state in which a pressure is applied thereto by the fitting recesses 16A, 19A of the bushing 16 and push member 19 of earth clamp 6, and the earth clamp 6 is mounted on the end portion so that conductor surface 9 is perpendicular to the existing reinforcement 5. The conductor plates 25, 25 are then inserted onto the end portion of existing reinforcement 5, the insertion opening 26 of stud base 7 is fit, and the contact surface 27 is pressed against the conductor plate 25. Then, similarly to the conventional stud welding technology, the distal end of stud reinforcement 4 loaded in the stud gun 1 is brought in contact with the end surface of existing reinforcement 5, and in a state in which the insertion opening 32 is fit onto the distal end portion of stud reinforcement 4 and the distal end surface of the inserted ferrule 8 is joined to the joining surface 29 of the stud base 7, the ferrule 8 is pushed by the ferrule contact part 11 and the stud gun 1 is positioned.

If the stud reinforcement 4 is thereafter retracted by the linear drive mechanism of the stud gun 1 and at the same time electric power is supplied from a welding power source (not shown in the figures) between the stud reinforcement 4 and the existing reinforcement 5 via the earth clamp 6, a short circuit current flows while the two reinforcements are in contact and an arc is generated if they are separated. After the distance between the stud reinforcement 4 and existing reinforcement 5 has been maintained constant for the prescribed time, the power supply from the welding power source is interrupted and, at the same time, the stud reinforcement 4 is moved forward by the linear drive mechanism of stud gun 1 and pressed against the existing reinforcement 5, providing for welding of the two reinforcements. Here, the forward travel distance is set somewhat larger than the backward travel distance of the stud reinforcement 4 and the difference between the two distances becomes a degree of penetration. Finally, the stud reinforcement 4 and stud gun 1 are separated, the earth clamp 6 is opened, the conductor plates 25, 25 are removed, the stud base 7 and ferrule 8 are fractured by lightly knocking with a hammer, and the series of stud welding operations is completed.

The conductor plates 25 and conductor surface 9 perpendicular to the existing reinforcement 5 formed by the push member 19 and bushing 16 of the earth clamp 6 provide a sufficient surface area around the end surface of existing reinforcement 5 serving as a welding surface and cause the relaxation of magnetic blow effect during stud welding, and the presence of the conductor surface 9 and conductor plates 25 makes it possible to conduct good horizontal stud welding of the reinforcements of the same diameter. Furthermore, the main effects of the stud base 7 include protecting the earth clamp 6 from large heat generated during welding, preventing the molten metal from overflowing and falling down, and realizing good stud welding by suppressing thickness reduction of the joint of the two reinforcements. Furthermore, conducting centering of the ferrule 8 and then centering of the existing reinforcement 5 and stud reinforcement 4 with the convex/concave fitting structure created by the collar 30 and protrusions 31, 31 on the joining surface of stud base 7 and ferrule 8 is also an important effect. The convex/concave fitting structure of stud base 7 and ferrule 8 is not limited to the above-described structure, and it is also possible to form a recess over the entire joining surface 29 of stud base 7, this recess being sufficient for fitting the outer periphery of the distal end portion of ferrule 8, but causing no closure of gas release grooves 28. Further, when horizontal stud welding is conducted, easily recognizable marks are preferably provided above and below the stud base 7 and ferrule 8; protrusions 31, 31 can also serve as those marks.

The stud base 7 is provided in order to form, together with the space 33 of ferrule 8, a shape which is wide inside and narrow at both ends (insertion openings 26, 32) and to allow for good stud welding by positioning the joining portions of distal ends of stud reinforcement 4 and existing reinforcement 5 inside this space. However, such stud welding can be conducted without the stud base 7 and only with the ferrule 8, provided that a similar space can be formed inside thereof. In the above-described embodiment, the stud base 4 and ferrule 5 were separated, but in the embodiment illustrated by FIGS. 6 through 11, an integrated ferrule is used in which the functions of the stud base 4 and ferrule 5 are combined. In the explanation of this structure, the components performing the functions identical to those performed by the stud base 7 and ferrule 8 are assigned with the same symbols.

Figure 6:
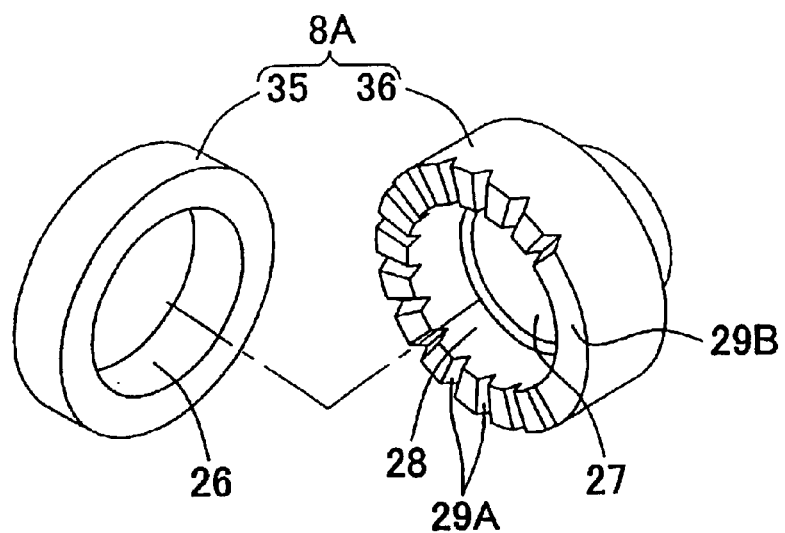
FIG. 6 is a perspective view illustrating a state during manufacture of a new ferrule in which functions of stud base and ferrule are integrated.
Figure 7:
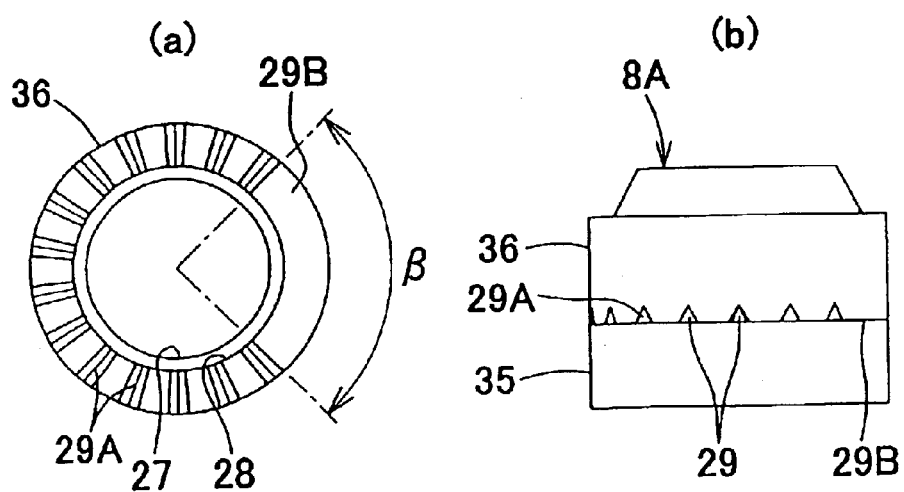
FIG. 7 illustrates a completed state of the ferrule shown in FIG. 6; (a) is a plan view from the distal end side of the ferrule part, (b) is a side view of the ferrule.

This new ferrule 8A has a structure shown in FIG. 7(b). The ferrule 8A has at both ends thereof the mounting openings 26, 27 into which the existing reinforcement 5 and stud reinforcement 4 can be respectively inserted and a space 28 for a molten metal pool inside thereof. Further, gas release openings 29, . . . are provided on the outer periphery of space 28. Because it is expensive to mold integrally the ferrule BA of such a shape from a ceramic material, first, as shown in FIG. 6, a stud base part 35 and a ferrule part 36 are molded similarly to the above described components and then the two components are joined to each other in a non-hardened state, fired, and integrated. Here, the stud base part 35 is in the form of a ring with an outer diameter equal to that of ferrule part 36, has in the center thereof the mounting opening 26 into which the end portion of the existing reinforcement 5 can be inserted and has flat surfaces on both surfaces thereof in the axial direction of mounting opening 26. In the ferrule part 36, the insertion opening 27 for inserting the distal end portion of stud reinforcement 4 is formed on a ring-like end thereof, the other end portion is expanded forming a space 28 for a molten metal pool inside thereof, and gas release grooves 29A, . . . serving as escape openings for gas generated during welding are formed on the distal end surface. A portion located therebelow is a flat surface 29B. The distal end surface of ferrule part 36 is joined to one side surface of stud base part 35 in a non-hardened state. At this time, water is coated on the joining surface to increase adhesion or a slurry-like ceramic material is coated and dried, followed by firing and integration. At this time, because of the presence of gas release grooves 29A, . . . and flat surface 29B of ferrule part 35, gas release openings 29, . . . are formed on the periphery, except the zone below the space 28 of ferrule BA. Here, as shown in FIG. 7(a), the central angle β of the flat surface 29B of ferrule part 35 is set to 60–180°, similarly to the above-described configuration. Further, a ferrule 8A of identical configuration can be also manufactured if the gas release grooves 29A, . . . and flat surface 29B are formed on one side surface of stud base part 35 and the distal end surface of ferrule part 36 is a plane.

In order to conduct horizontal stud welding of stud reinforcement 4 to existing reinforcement 5 by using the above-described ferrule BA, the earth clamp 3 having a conductor surface 7 perpendicular to the existing reinforcement 5 is removably mounted in the same manner as described above over the periphery of the end portion of existing reinforcement 5, the ferrule 8A is mounted by fitting the mounting opening 26 on the end portion of existing reinforcement 5 or by fitting the mounting opening 27 on the distal end portion of stud reinforcement 4 loaded in the stud welding gun, the distal end of stud reinforcement 4 is brought in contact with the end surface of existing reinforcement 5, and stud welding is conducted in a state in which the ferrule 8A is pressed against the conductor surface 7 of earth clamp 3.

Figure 8:
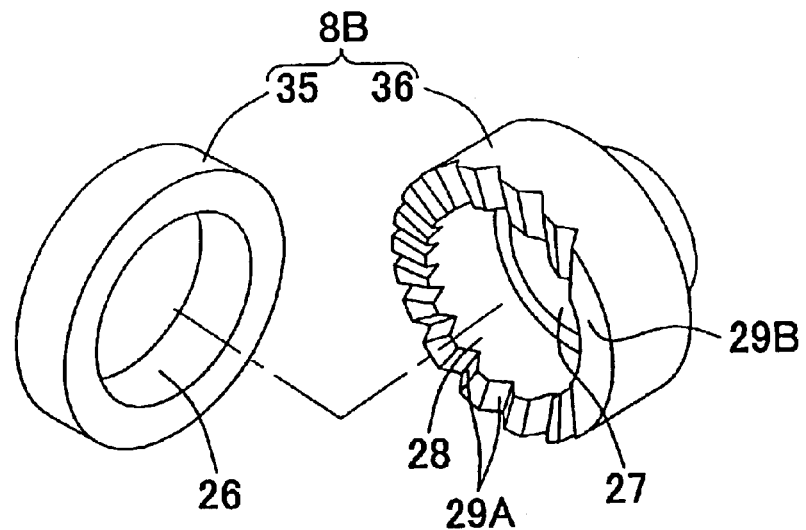
FIG. 8 is a perspective view illustrating a state during manufacture and showing a modification of the new ferrule in which functions of stud base and ferrule are integrated.
Figure 9:
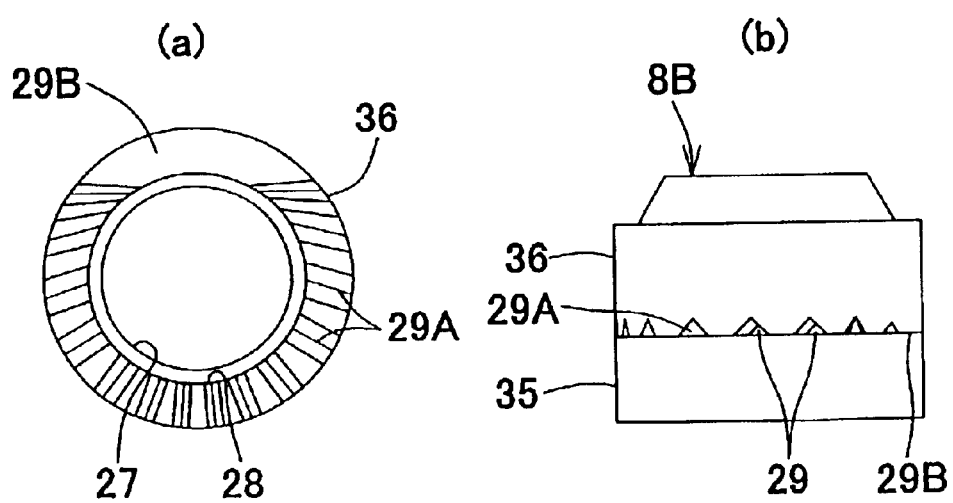
FIG. 9 illustrates a completed state of the ferrule shown in FIG. 8; (a) is a plan view which is viewed from the distal end side of the ferrule part, (b) is a side view of the ferrule.

Further, a ferrule 8B shown in FIG. 8 and FIG. 9 is a modification of ferrule 8A. The difference between the two ferrules is in that the gas release grooves 29A, . . . of the above-described ferrule part 36 were formed so as to pass radially from the center, whereas in this modification example, the gas release grooves 29A, . . . are formed radially from a center located in the point shifted from the center of ferrule part 36 to the flat surface 29B. As a result, despite the presence of flat surface 29B, gases generated during welding can be discharged almost uniformly over the periphery of ferrule part 36. Other aspects of the configuration are identical to the above-described ones.

Figure 10:
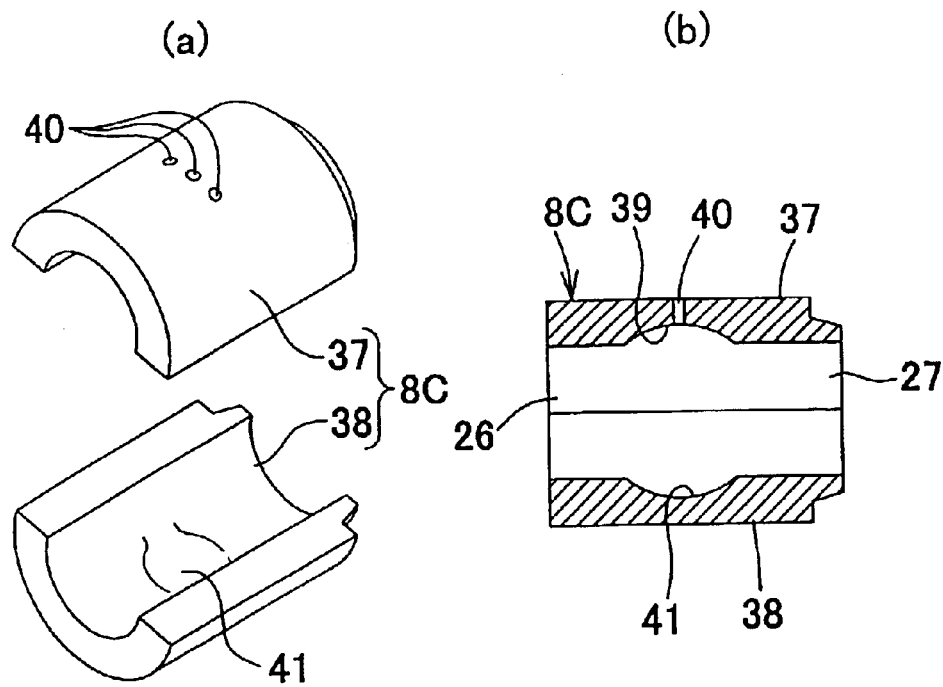
FIG. 10 illustrates another embodiment of the ferrule; (a) is an exploded perspective view, (b) is a longitudinal sectional view illustrating a joined state.

The ferrule 8C shown in FIG. 10 is obtained by joining and integrating a semi-cylindrical upper split section 37 and a semi-cylindrical lower split section 38 obtained by splitting along the axial direction into the upper and lower sections. A recess 39 for forming a space is formed in the central part on the inner surface of upper split section 37, a gas release hole 40 passing through to the recess 39 is formed, and a recess 41 for forming a space is formed in the central part on the inner surface of lower split section 38. The space formed by the recess 39 and recess 41 is in the form of an ellipsoid with a long axis in the vertical direction. As a result, molten metal rotation is improved and ideal stud welding can be implemented in which the weld zone of the stud reinforcement 4 and existing reinforcement 5 has a rounded built-up shape.

Figure 11:
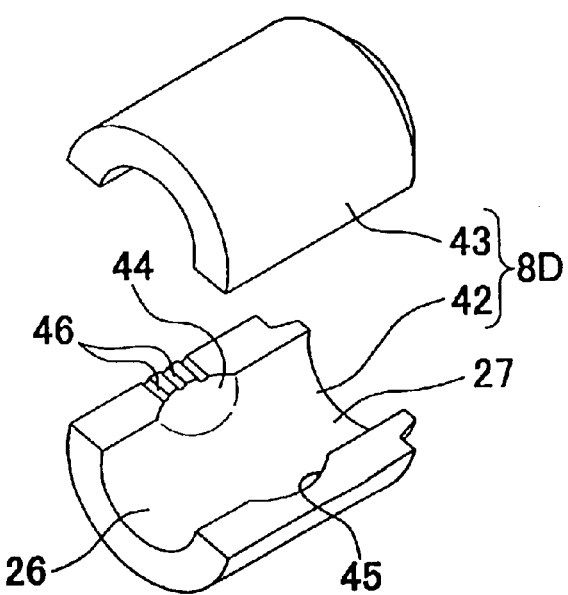
FIG. 11 is an exploded perspective view illustrating yet another embodiment of the ferrule.

The ferrule 8D shown in FIG. 11 is obtained by joining and integrating a semi-cylindrical left split section 42 and a semi-cylindrical right split section 43 obtained by splitting along the axial direction into the left and right sections. An upper recess 44 and a lower recess 45 for forming a space are formed in the upper and lower parts on the inner surface of left split section 42, a gas release groove 46 passing through to the upper recess 44 is formed on the joining surface in the central part, and the right split section 43 has a shape symmetrical to that of the left split section 42. In this case, too, the space inside the ferrule 8D is in the form of an ellipsoid with a long axis in the vertical direction.

Figure 12:
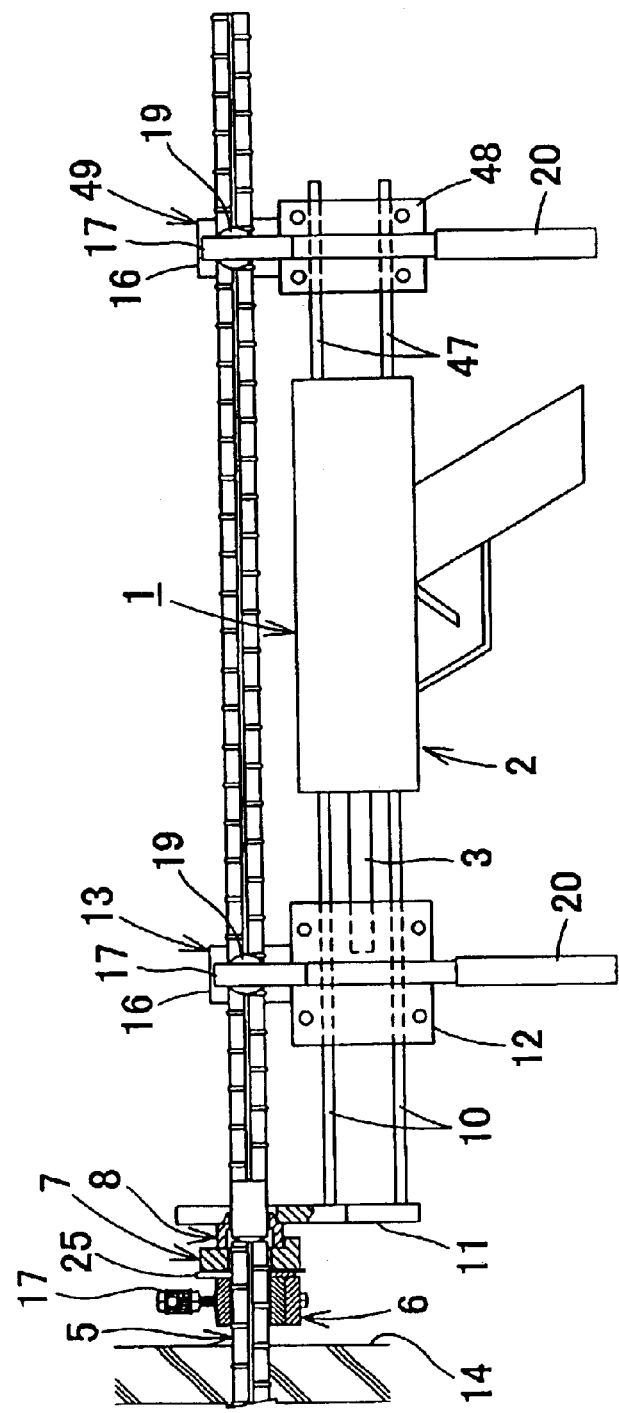
FIG. 12 is a simplified side view, with a partial cutout, illustrating a modification of the first embodiment of the stud welding apparatus in accordance with the present invention.
Figure 13:
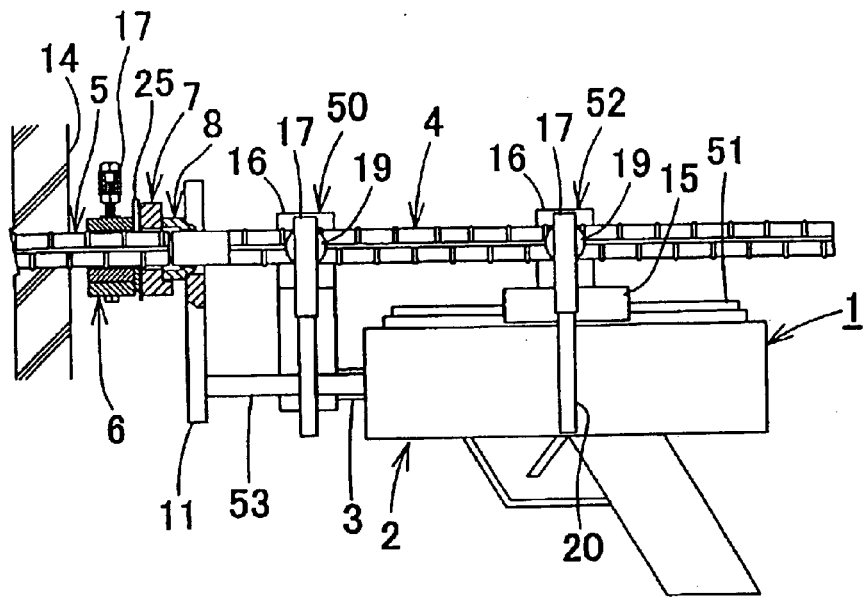
FIG. 13 is a simplified side view, with a partial cutout, illustrating the second embodiment of the stud welding apparatus in accordance with the present invention.
Figure 14:
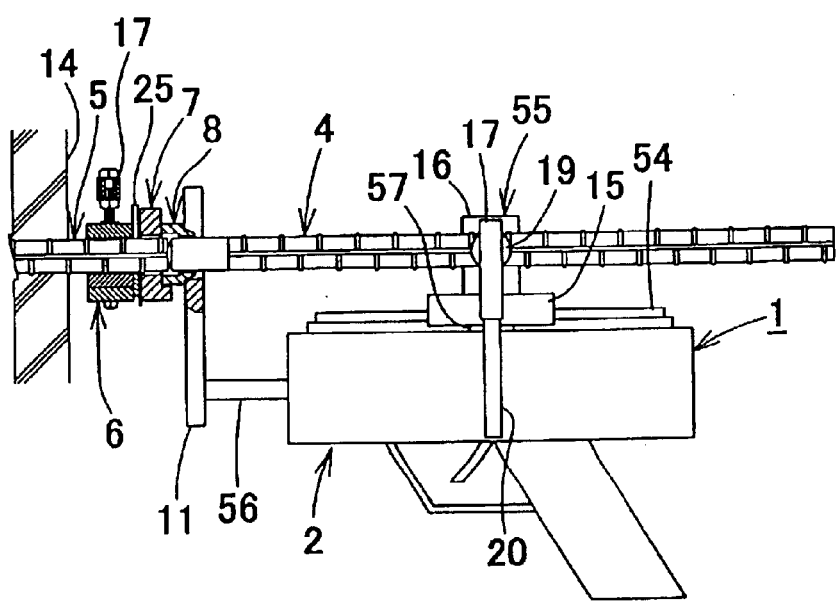
FIG. 14 is a simplified side view, with a partial cutout, illustrating the third embodiment of the stud welding apparatus in accordance with the present invention.

Another embodiment of the stud gun 1 will be explained below based on FIGS. 12 through 14. The stud gun 1 shown in FIG. 12 is a modification of the stud gun of Embodiment 1. In case of a long stud reinforcement 4, holding the stud reinforcement 4 only with the stud holding tool 13 sometimes becomes unstable. In this case, as shown in FIG. 12, one or a plurality of second guide poles 47, 47 are provided in a protruding condition parallel to the drive shaft 3 behind the gun body 2, a second stud holding tool 49 is provided on a second movable body 48 slidably provided on the second guide poles 47, 47, and the stud reinforcement 4 is arranged above the gun body with the front stud holding tool 13 and rear second stud holding tool 49. Further, if a transverse orientation of stud holding tool 13 and second stud holding tool 49 is set (this configuration is not shown in the figures), the stud reinforcement 4 can be arranged on the side of gun body 2. Other aspects of this configuration are identical to those shown in FIG. 1. Identical components are assigned with the same reference symbols and explanation thereof is omitted.

The second embodiment of stud gun 1 will be explained below based on FIG. 13. In the stud gun 1 of the present embodiment, a stud holding tool 50 is transversely provided on the distal end portion of drive shaft 3 for linearly driving the stud gun body 1, a linear guide 51 is provided parallel to the drive shaft 3 along the upper surface of gun body 2, an auxiliary stud holding tool 52 is slidably provided on the linear guide 51, a ferrule contact member 53 is provided on the distal end in front of gun body 2, and the stud reinforcement 4 mounted on the stud holding tool 50 and auxiliary stud holding tool 52 is arranged above the gun body. It is also possible to arrange the stud holding tool 50 sidewise, to provide the linear guide 51 on the side of gun body 2, and to arrange the stud reinforcement 4 on the side of the gun body (this configuration is not shown in the figures). Other aspects of this configuration are identical to those shown in FIG. 1. Identical components are assigned with the same reference symbols and explanation thereof is omitted.

The third embodiment of stud gun 1 will be explained below based on FIG. 14. In the stud gun 1 of the present embodiment, a linear guide 54 is provided along the upper surface of stud gun body 2, a stud holding tool 55 is provided so that it can be slidably moved with a linear drive mechanism along the linear guide 54, a ferrule contact member 56 is provided on the distal end in front of the gun body 2, and the stud reinforcement 4 mounted on the stud holding tool 55 is arranged above the gun body 2. It is also possible to provide the linear guide 54 on the side of gun body 2, to arrange the stud holding tool 55 sidewise, and to arrange the stud reinforcement 4 on the side of the gun body (this configuration is not shown in the figures). In the present embodiment, the above-described drive shaft is not present, and the movable part 57 of linear driving mechanism contained in the gun body 2 is directly linked to the stud holding tool 55 for drive in the forward and rearward direction. In the present embodiment, the entire length of stud gun 1 can be reduced to a minimum and a stud welding operation can be conducted in even narrower work space. Other aspects of this configuration are identical to those shown in FIG. 1. Identical components are assigned with the same reference symbols and explanation thereof is omitted.

The above-described stud gun 1 can be used, without any obstacles, in horizontal position or upon turning it over in the vertical direction according to the requirements of the work site. The stud gun 1 obviously can be used in downward or upward orientation.

Test results obtained in horizontal stud welding of reinforcements of the same diameter in accordance with the present invention will be described below. The base shaped reinforcement that was used (corresponds to the existing reinforcement 5) was D16 (KDS490D), and the shaped stud (corresponds to stud reinforcement 4) was D16×300 (KDS490D) consisting of steel of the same type. The steel used had the following mechanical properties: yield point 393 N/mm$^2$, tensile strength 504 N/mm$^2$, elongation 29%. The results of tensile test of the five stud-welded samples are shown in Table 1. External appearance observations produced good results in all cases and the fracture position was on the bar portion different from the weld zone.

TABLE 1

| Sample | Welding conditions | Tensile test results | | | |
| --- | --- | --- | --- | --- | --- |
| | | External appearance observations | Tension load (kN) | Tensile strength (N/mm$^2$) | Fracture position |
| 1 | 1300 A 0.6 s | good | 101.8 | 513 | bar portion |
| 2 | | good | 102.1 | 514 | bar portion |
| 3 | | good | 101.6 | 512 | bar portion |
| 4 | | good | 102.1 | 514 | bar portion |
| 5 | | good | 103.0 | 519 | bar portion |

A repairing/expanding method for a ferroconcrete structure implemented by using the above-described stud welding apparatus will be described below based on FIGS. 15 through 19.

Figure 15:
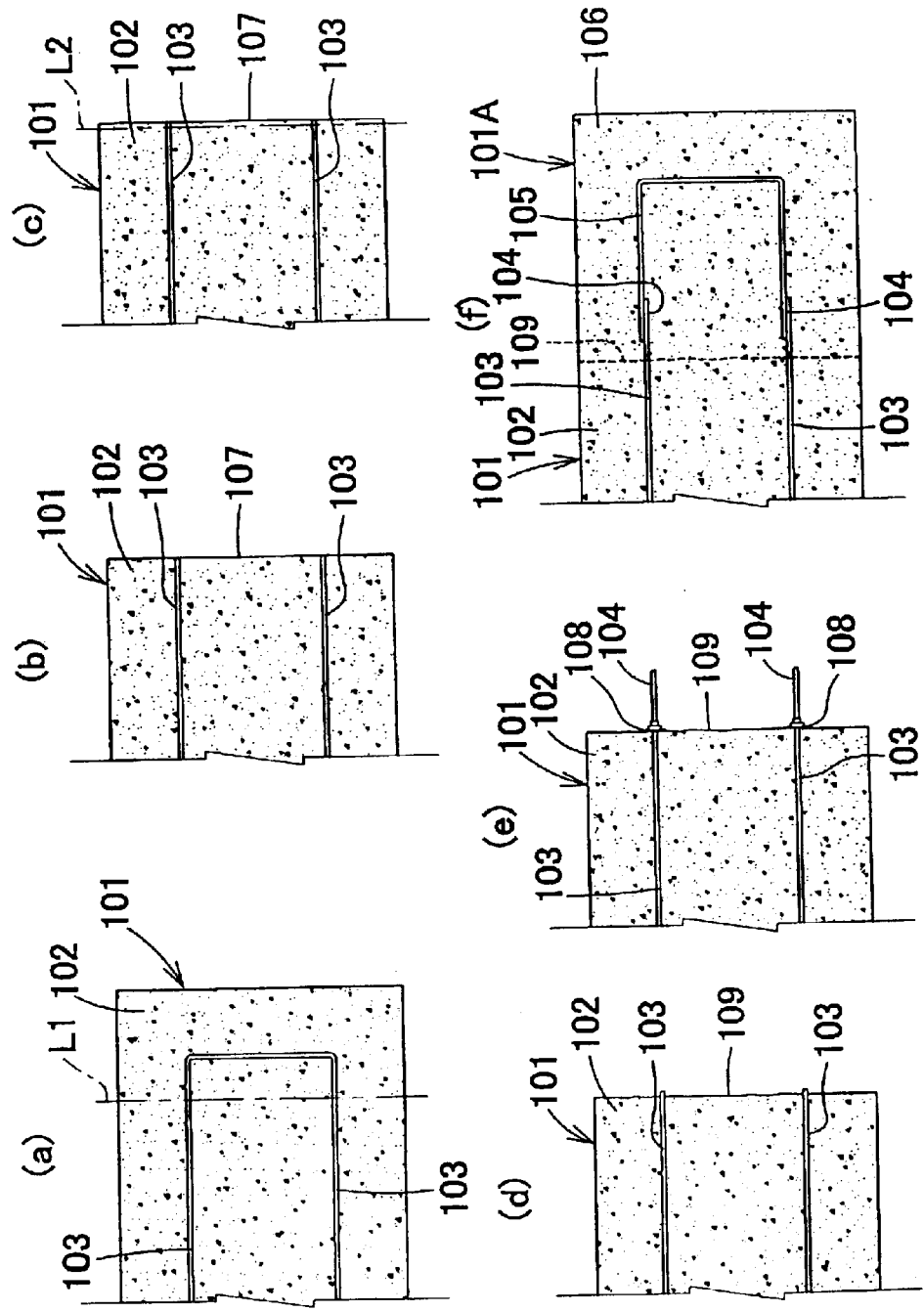
FIG. 15 is a simplified view for explaining the basic steps of the method in accordance with the present invention; (a)–(f) are cross-sectional views illustrating the state of a ferroconcrete structure in each step.
Figure 16:
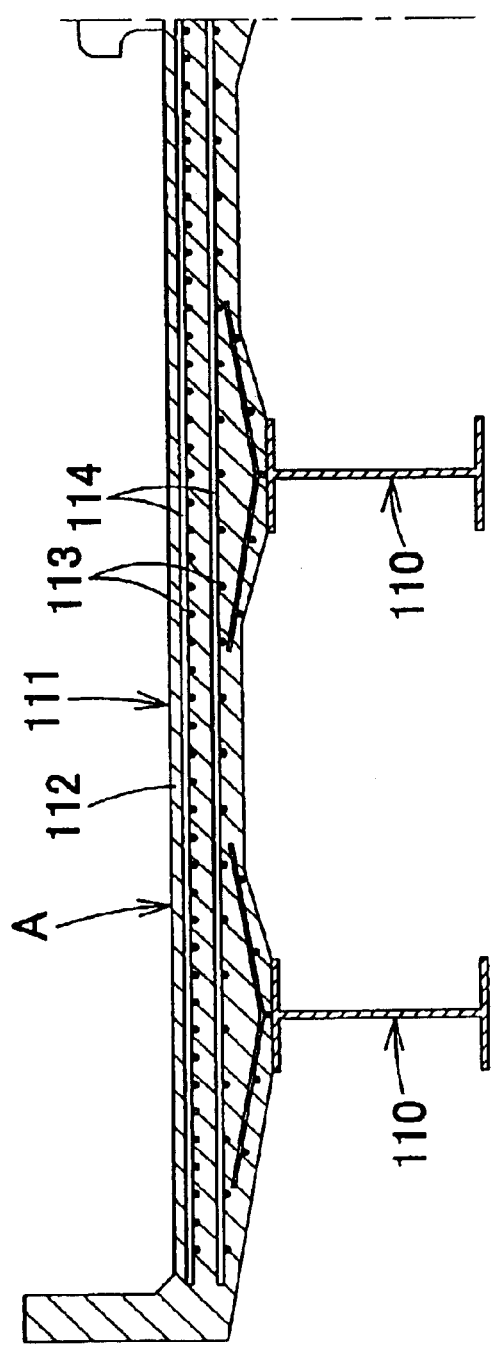
FIG. 16 is a simplified cross-sectional view in the direction perpendicular to the axial direction of a hollow-slab bridge.

FIG. 15 illustrates the basic process of the repairing/expanding method for a ferroconcrete structure in accordance with the present invention. In the figure, the reference symbol 101 stands for an existing ferroconcrete structure, 102—an existing concrete portion, 103—an existing reinforcement, 104—a new reinforcement (stud reinforcement), 105—an auxiliary reinforcement, and 106—a new concrete portion.

The existing ferroconcrete structure 101, as shown in FIG. 15(*a*) is a structure in which the existing reinforcements 103 are arranged in the longitudinal and transverse direction inside the existing concrete portion 102. For example, in case of a steel bridge A shown in FIG. 16, steel girders 110, . . . are set on bridge piers (not shown in the figure) and a concrete deck slab 111 is constructed on the steel girders 110, . . . . The structure of the concrete deck slab 111 is such that distribution reinforcements 113, . . . are installed in the upper and lower portions inside the concrete part 112 in the axial direction of the bridge, and the principal reinforcements 114, . . . are also installed in the upper and lower portions in the widthwise direction. Furthermore, the number of upper principal reinforcements 114 is usually set twice as large as that of the lower principal reinforcements 114. In the below described process for the replacement of an expansion unit, a new distribution reinforcement has to be connected to the distribution reinforcement 113, and in the traffic lane widening process, a new principal reinforcement has to be connected to the principal reinforcement 114.

The basic procedure in the present embodiment comprises: a cutting process (see FIGS. 15(*a*), (*b*)) in which the existing reinforcement 103 and existing concrete part 102, which are a part of the existing ferroconcrete structure 101, are cut at the same time along a cutting line L1; a coarse grinding process (see FIGS. 15(*c*), (*d*)) in which the cut surface 107 of existing ferroconcrete structure 101 is removed, in a coarsely ground state, through a thickness of 1–3 cm (to a coarse grinding line L2) over the entire surface and the end portions of existing reinforcements 103 are exposed, an earth clamp mounting process (see FIG. 15(*e*)) in which earth clamps 108 having an earth terminal and a conductor surface serving as a ferrule contact surface are secured to the end portions of the existing reinforcements 103 exposed on the aforesaid cut surface 107, so that the conductor surface of the clamp is almost perpendicular to the new reinforcement 104 which is to be welded thereafter; a stud welding process (see FIG. 15(*e*)) in which the end portion of the new reinforcement 104 of the same diameter as the existing reinforcement is almost coaxially stud welded to the end surface of the existing reinforcement 103 exposed on the concrete ground surface 109 to form an extension thereof; a reinforcement distribution process in which an auxiliary reinforcement 105 is further connected to the new reinforcements 104 by welding and other auxiliary reinforcements 105 are distributed; and a concrete placement process (see FIG. 15(*f*)) in which concrete is placed. As a result, a new ferroconcrete structure 101A in which the new reinforcements 104 and auxiliary reinforcements 105 are integrated inside the new concrete part 106 can be reconstructed or constructed anew in the portion where the existing ferroconcrete structure 101 has been partially removed.

A breaking process conducted to a degree necessary to expose the end portion of existing reinforcement 103 by breaking partially only the periphery of the existing reinforcement 103 on the cut surface 107 of the ferroconcrete structure 101 may be used instead of the above-mentioned coarse grinding process. In this case, the existing concrete part 102 is removed only partially. Therefore, the work time is further shortened and generation of noise is further reduced.

Instead of using the earth clamp 108, it is also possible to weld a backup plate to the end portion of existing reinforcement 103, to connect the backup plate to the ground, and to conduct spot welding by bringing the ferrule in contact with the back-up plate (this configuration is not shown in the figure). In this case, the back-up plate becomes unnecessary upon completion of stud welding and is allowed to stay inside the new concrete part; the backup plate has a small size of about 3 cm square to produce no effect on concrete strength.

Figure 17:
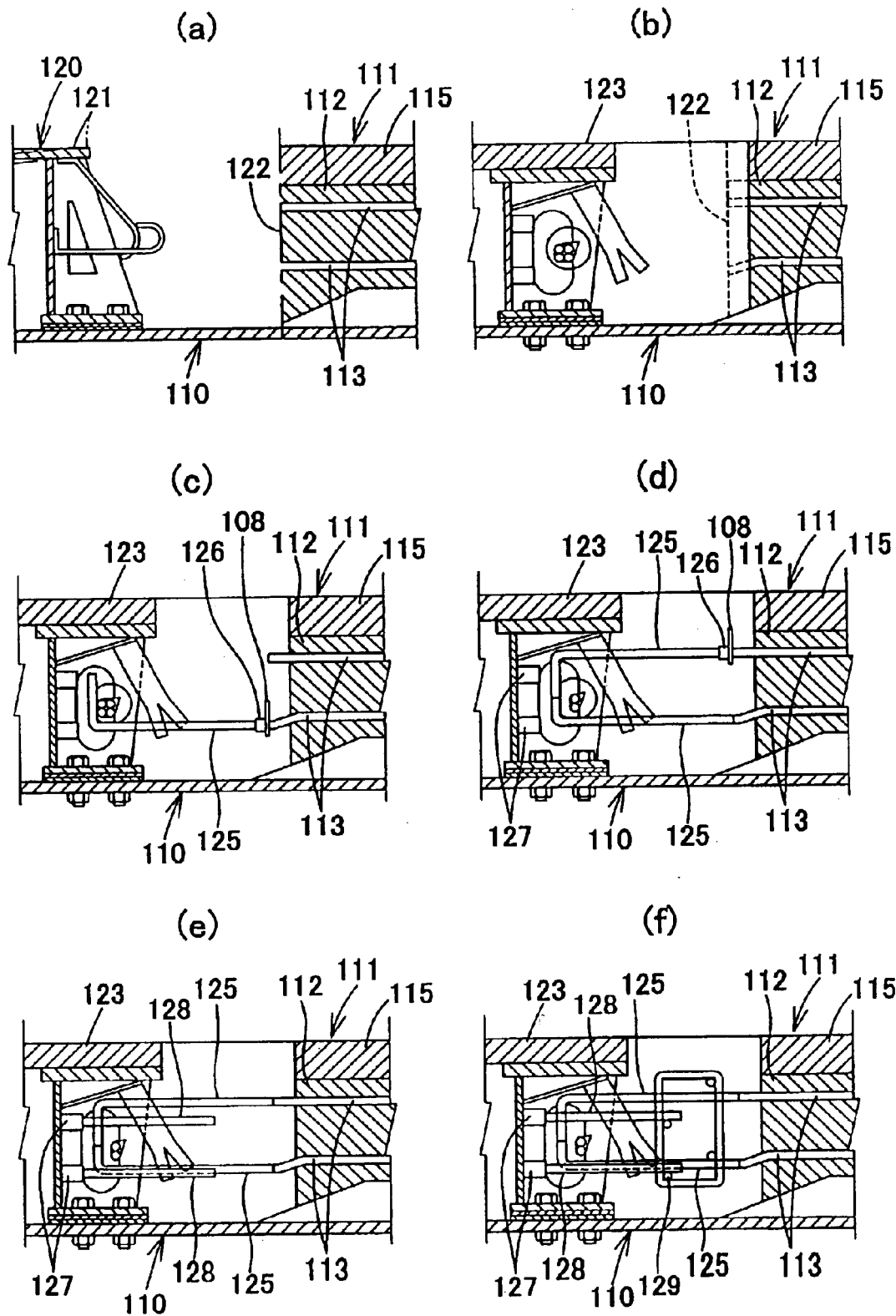
FIG. 17 is a simplified view for explaining the operation of replacing an expansion unit by employing the method in accordance with the present invention; (a)–(f) are cross-sectional views illustrating the state of concrete deck slabs in each step.

A case in which the method in accordance with the present invention is applied to replacing an expansion unit 120 provided in the joint portion of concrete deck slabs will be explained with reference to FIG. 17. First, as shown in FIG. 17(a), the end portion of the concrete part 112 of concrete deck slab 111 is cut out together with the internal distribution reinforcements 113, . . . with a rotary cutter or a wire sawing machine and then the cut end portion of the concrete deck slab 111 and one existing steel member 121 constituting the expansion unit 120 are removed. The reference symbol 115 in the figure stands for an asphalt layer placed on the upper surface of concrete part 112. Thereafter, as shown in FIG. 17(b), the cut surface 122 of concrete part 112 is ground through a thickness of 1–3 cm with a rock drill over the entire surface and the end portion of distribution reinforcement 113 is exposed, followed by the installation of a new steel member 123. The earth clamp 108 is thereafter mounted on the end portion of distribution reinforcements 113 to provide for electric conductivity. Then, as shown in FIG. 17(c), (d), new, L-shaped distribution reinforcements 125 are stud welded to the end portions of distribution reinforcements 113, while pressing the ferrule 126 against the ferrule contact surface of earth clamp 108. Further, the end portions of distribution reinforcements 125, 125 positioned above and below are stacked and tied up with a binding wire to obtain a reinforcement with a U-like shape in the side view thereof. After stud welding is completed, the earth clamp 108 is removed and the ferrule 126 is broken to pieces and removed. Then, as shown in FIG. 17(e), (f), auxiliary reinforcements 128 are screwed in the nuts 127, . . . that have been fixed by stud welding to the side surface of the above-described new steel member 123, and other auxiliary reinforcement 129 is assembled. Finally, if necessary, a frame is constructed, concrete is jet placed and upon setting, traffic is opened and work is completed.

Here, the stud welding method and the stud gun used therefore are those in accordance with the above-described present invention. First, a distal end protrusion of new distribution reinforcement 125 is brought in contact with the end surface of existing distribution reinforcement 113, the new distribution reinforcement 125 is slightly retracted, while passing a large electric current to the two distribution reinforcements 113, 125, an arc discharge is maintained between the two distribution reinforcements, and immediately after the end portions of the reinforcements have melted, the new distribution reinforcement 125 is moved forward and welded to the end portion of distribution reinforcement 113. Here, the ferrule 126 has an escape opening for gas generated during welding and a space where the molten reinforcements are sealed.

Figure 18:
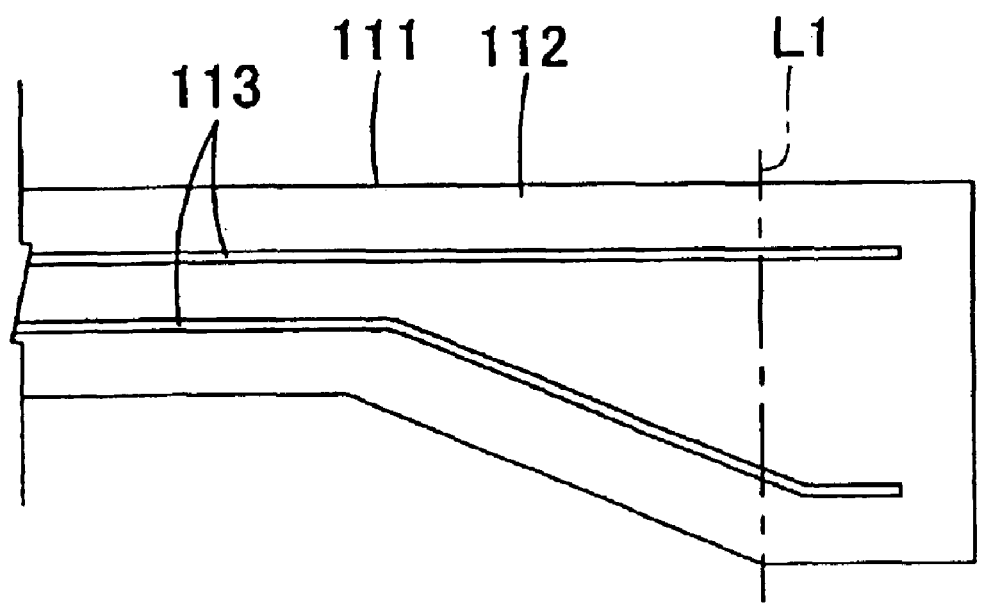
FIG. 18 is a simplified cross-sectional view of an end portion of a concrete deck slab.

FIG. 18 shows that when the end portion of concrete deck slab 111 is actually cut along the cutting line L1, there is an existing reinforcement 113 cut at a right angle to the longitudinal direction thereof and an existing reinforcement cut obliquely. Therefore, in order to realize the process in accordance with the present invention, it is necessary to make it possible to stud weld a new reinforcement 125 at a right angle not only to the end surface of the existing reinforcement 113 which is cut at a right angle, but also to the oblique cut end surface. In this case, efforts are taken to ensure that the ferrule contact surface is perpendicular to the new reinforcement 125 which is to be welded thereafter, in a state in which the earth clamp 108 is fixed to the existing reinforcement 113.

Figure 19:
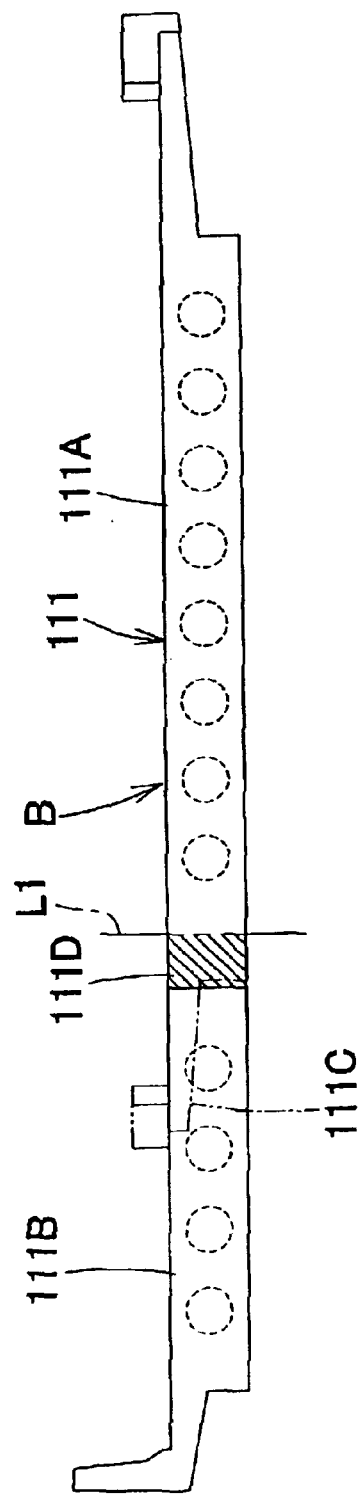
FIG. 19 is a simplified view for explaining the operation of widening a concrete deck slab.
Figure 20:
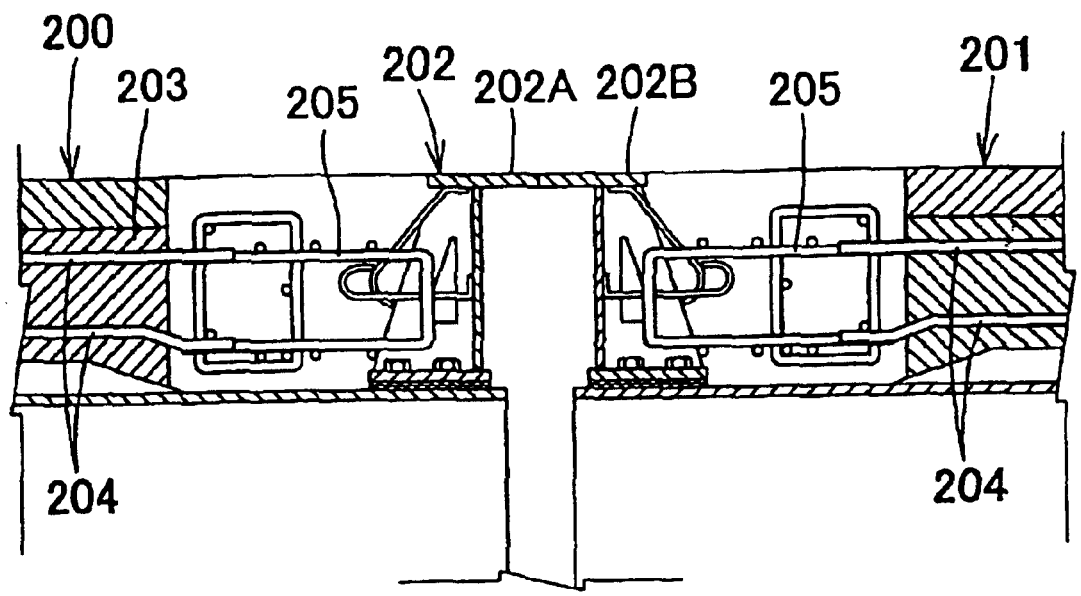
FIG. 20 is a simplified view for explaining the conventional operation of replacing an expansion unit.
Figure 21:
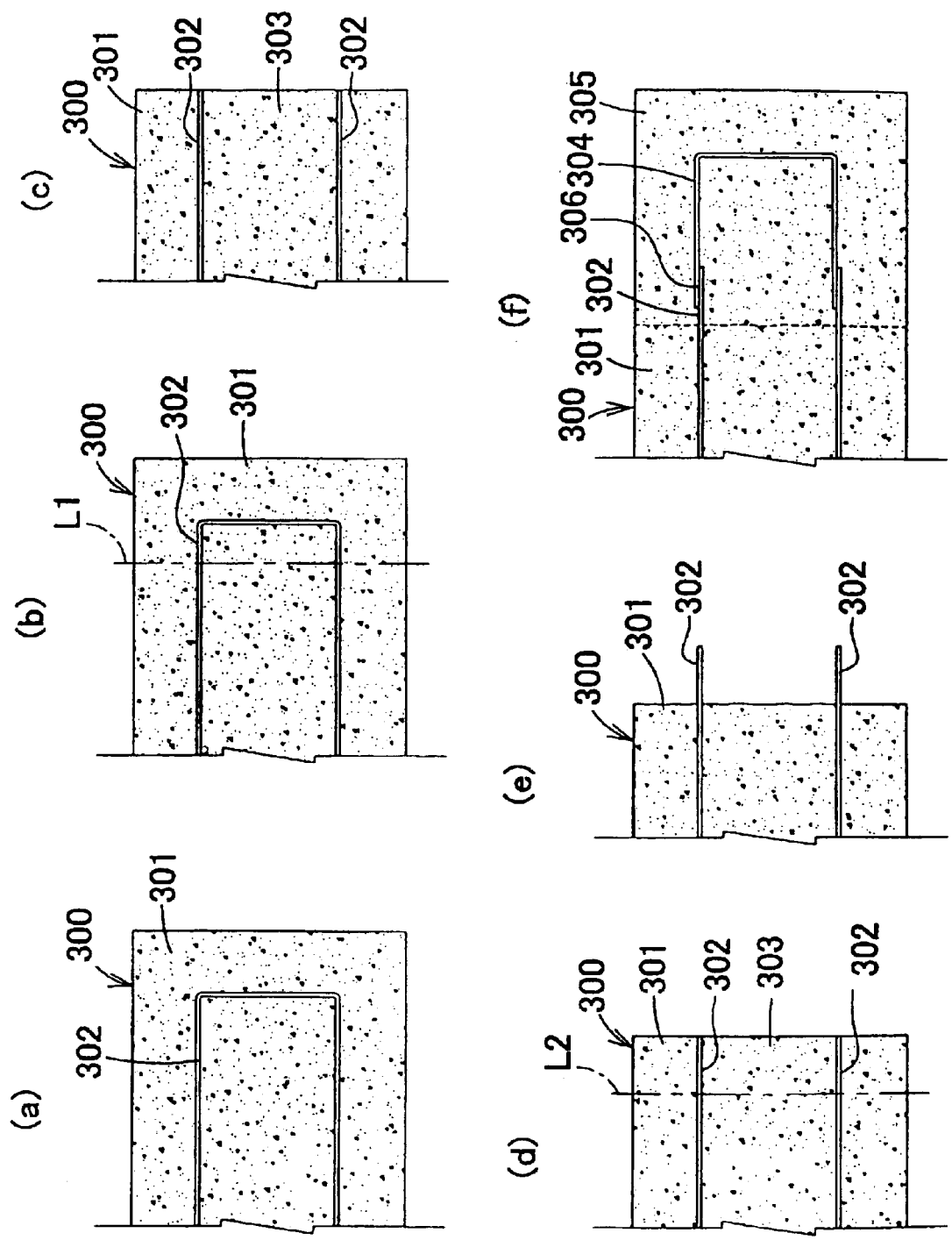
FIG. 21 is a simplified view for explaining the basic steps of the conventional method; (a)–(f) are cross-sectional views illustrating the state of a ferroconcrete structure in each step.

FIG. 19 shows a scheme of a widening process for a concrete deck slab 111 in a hollow-slab bridge B. In this figure, the reference symbol 111A stands for an existing concrete deck slab, and 111B—a new concrete deck slab. In this widening process, the side part of the existing concrete deck slab 111A is cut along the bridge axis direction and the new concrete deck slab 111B is constructed on the side thereof by the method in accordance with the present invention. More specifically, the method in accordance with the present invention is applied to cut the side part 111C of the existing concrete deck slab 111A along the cutting line L1, to construct the new concrete deck slab 111B in the position removed from the cut surface, and to construct a connecting portion 111D between the existing concrete deck slab 111A and new concrete deck slab 111B. The method is described in detail hereinabove, and explanation thereof is herein omitted. The new concrete deck slab 111B can be directly constructed by applying the method in accordance with the present invention, without providing the connecting portion 111D.

Further, the repairing/expanding method for a ferroconcrete structure in accordance with the present invention is not limited to the above-described process for the replacement of an expansion unit or the widening process for a concrete deck slab, and the present specification and description of the drawings clearly demonstrate that this method is also suitable for a wide range of typical ferroconcrete structures, for example, for strengthening and modifying the inner surface of tunnels and the like.

Furthermore, when a new ferroconcrete structure is manufactured, the reinforcements are connected by lap joining. However, because the lap allowance is very large, the process is cost-inefficient. Moreover, the binding wire often comes off or becomes loose, causing displacement of reinforcements from the prescribed position and structural defects. The present invention is also suitable for connecting the reinforcements of such newly constructed ferroconcrete structure to each other.

INDUSTRIAL APPLICABILITY

With the reinforcement butt stud welding method in accordance with the first aspect of the present invention, reinforcements of approximately the same diameter can be welded together and good welding can be conducted even when the reinforcements are in an almost horizontal state. In particular, when an existing ferroconcrete structure is partially cut and a new ferroconcrete portion is constructed in the cut part, the operation of concrete breaking can be substantially reduced, the term of works can be shortened, and noise generation can be decreased. In addition, using a stud base allows thermal damage of the earth clamp to be restricted and the earth clamp to be used repeatedly.

Therefore, a contribution is made to cost reduction and good stud welding can be conducted.

With the stud welding apparatus in accordance with the second aspect of the present invention, the gun structure is such that the entire length in a state in which a stud reinforcement has been mounted on the stud gun is determined by the length of the stud reinforcement itself. Therefore, a stud reinforcement can be coaxially butt welded to the end portion of a horizontally laid existing reinforcement in a work space which is substantially narrower than that required for the conventional structures and a good welding state can be obtained.

With the repairing/expanding method for a ferroconcrete structure in accordance with the third aspect of the present invention, the operation of concrete breaking can be substantially reduced, the term of works can be shortened, and noise generation can be decreased. Furthermore, the quantity of generated industrial waste is greatly decreased, thereby limiting the waste processing cost and greatly improving the state of construction site. In addition, the breaking quantity of concrete after cutting can be restricted to less than about ⅕ that of the conventional process, the period of noise generation during this operation can be greatly shortened, and shortening of the term of works is also significant.

Moreover, the term of works in replacing an expansion unit disposed in a joint portion of concrete deck slabs of a bridge, lateral width expanding the deck slabs of a bridge, and reinforcing and modifying the internal surface of a tunnel can be greatly shortened, the traffic restriction period can be shortened, and the effect produced on industrial activity using the road can be decreased. In particular, when the construction work is conducted in an urban area, the effect on the residents in the neighborhood can be also decreased.

What is claimed is:

1. A reinforcement butt stud welding method comprising the steps of:
    removably mounting an earth clamp having a conductor surface perpendicular to an existing reinforcement over the periphery of the end portion of said existing reinforcement;
    mounting a ring-like stud base composed of a heat-resistant electrically insulating material on the conductor surface of said earth clamp in a state in which the stud base is pressed against the conductor surface;
    bringing a distal end of a stud reinforcement loaded in a stud welding gun in contact with the end surface of said existing reinforcement; and
    conducting stud welding in a state in which a ferrule disposed over the periphery of the distal end portion of said stud reinforcement is joined to said stud base;
    wherein said stud base has a mounting opening in the central part, into which the end portion of said existing reinforcement can be inserted, a contact surface pressed against the conductor surface of said earth clamp is formed on a side surface in the axial direction of said mounting opening, and a joining surface for joining the distal end surface of said ferrule having gas release grooves and a collar receiving said ferrule and molten metal in the lower part are formed on the other side surface in the axial direction of the mounting opening.

2. A reinforcement butt stud welding method comprising the steps of:
    removably mounting an earth clamp having a conductor surface perpendicular to an existing reinforcement over the periphery of the end portion of said existing reinforcement;
    mounting a ferrule on the end portion of said existing reinforcement or on the distal end portion of a stud reinforcement loaded in a stud welding gun, this ferrule having on both ends thereof mounting openings into which the existing reinforcement and stud reinforcement can be respectively inserted and inside thereof a space for a molten metal pool and also having gas release openings on the periphery of said space;
    bringing the distal end of said stud reinforcement in contact with the end surface of said existing reinforcement; and
    conducting stud welding in a state in which said ferrule is pressed against the conductor surface of said earth clamp.

3. A stud welding apparatus, comprising:
    a stud gun wherein at least one guide pole is provided in a protruding condition, parallel to a drive shaft for linear driving, in front of a stud gun body;
    a ferrule contact part is formed on the distal ends of said at least one guide pole;
    a movable body slidably provided in the middle portion of said at least one guide pole is linked to said drive shaft;
    a stud holding tool is provided on said movable body; a stud reinforcement mounted on said stud holding tool is disposed above the gun body or on the side thereof; and
    an earth clamp removably mounted by sandwiching an existing reinforcement between a bushing and push member, wherein a conductor surface perpendicular to the existing reinforcement is formed by the bushing and push member.

4. A stud welding apparatus comprising:
    a stud gun wherein at least one guide pole is provided in a protruding condition, parallel to a drive shaft for linear driving, in front of a stud gun body; a ferrule contact part is formed on the distal end of said at least one guide pole; a movable body slidably provided in the middle portion of said at least one guide pole is linked to said drive shaft; a stud holding tool is provided on said movable body; and a stud reinforcement mounted on said stud holding tool is disposed above the gun body or on the side thereof;
    wherein at least one second guide pole is provided in a protruding condition, parallel to said drive shaft behind said stud gun body;
    a second stud holding tool is provided on a second movable body slidably provided on said at least one second guide pole; and
    a stud reinforcement is disposed above the gun body or on the side thereof by said front stud holding tool and said rear second stud holding tool; and
    an earth clamp removably mounted by sandwiching an existing reinforcement between a bushing and push member, wherein a conductor surface perpendicular to the existing reinforcement is brined by the bushing and gush member.

5. A stud welding apparatus comprising:
    a stud gun, wherein a stud holding tool is provided perpendicular to a distal end portion of a drive shaft for linearly driving a stud gun body;
    a linear guide is provided parallel to said drive shaft along the upper surface or side surface of the gun body;
    an auxiliary stud holding tool is slidably provided on said linear guide; a ferrule contact member is provided at the front distal end of the gun body; and a stud reinforcement mounted on said stud holding tool and auxiliary stud holding tool is disposed above the gun body or on the side thereof, and an earth clamp removably mounted by sandwiching an existing reinforcement between a bushing and gush member, wherein a conductor surface perpendicular to the existing reinforcement is formed by the bushing and push member.

6. A stud welding apparatus, comprising:

a stud gun wherein a linear guide is provided along the upper surface or side surface of a stud gun body;

a stud holding tool is provided on said linear guide so that the tool can be slidably moved by a linear driving mechanism;

a ferrule contact member is provided at the front distal end of the gun body; and a stud reinforcement mounted on said stud holding tool is disposed above the gun body or on the side thereof; and an earth clamp removably mounted by sandwiching an existing reinforcement between a bushing and push member, wherein a conductor surface perpendicular to the existing reinforcement is formed by the bushing and push member.

7. The stud welding apparatus as described in any of claims 4 through 6, wherein said stud reinforcement is produced as a shaped reinforcement.

8. The stud welding apparatus as described in any of claims 3 through 6, comprising:

a ring-like stud base composed of a heat-resistant electrically insulating material which is mounted in a state in which it is pressed against the conductor surface of the earth clamp on the periphery of the end portion of said existing reinforcement; and a ferrule which is mounted on the periphery of the distal end portion of said stud reinforcement and can be joined to said stud base.

9. The stud welding apparatus according to any one of claims 3 to 6, comprising a ferrule having on both ends thereof mounting openings into which the existing reinforcement and stud reinforcement can be respectively inserted and inside thereof a space for a molten metal pool and also having gas release openings on the periphery of the space.

* * * * *